United States Patent [19]
Hegeman et al.

[11] Patent Number: 6,080,299
[45] Date of Patent: Jun. 27, 2000

[54] METHOD FOR REMOVAL OF NICKEL AND IRON FROM ALKALI METAL HYDROXIDE MANUFACTURING PROCESS REQUIRING THE USE OF SODIUM BOROHYDRIDE

[75] Inventors: John William Hegeman; Todd Richard Pickle; Gary Lee Sulik, all of Henderson, Nev.

[73] Assignee: Pioneer (East) Inc., Wilmington, Del.

[21] Appl. No.: 09/419,685

[22] Filed: Oct. 14, 1999

[51] Int. Cl.[7] .................................................. C25B 1/34
[52] U.S. Cl. ......................... 205/516; 205/536; 210/695
[58] Field of Search .................................... 205/516, 536; 210/695

[56] References Cited

U.S. PATENT DOCUMENTS

| | | | |
|---|---|---|---|
| 3,944,479 | 3/1976 | Ruthel et al. | 204/297 R |
| 4,025,405 | 5/1977 | Dotson et al. | 205/512 |
| 4,039,568 | 8/1977 | Sakai et al. | |
| 4,065,376 | 12/1977 | Whyte et al. | 204/263 |
| 4,104,133 | 8/1978 | Brannan et al. | 205/122 |
| 4,252,878 | 2/1981 | Lazarz et al. | 429/250 |
| 4,260,469 | 4/1981 | McIntyre et al. | 204/265 |
| 4,806,264 | 2/1989 | Murphy | 210/695 |
| 5,290,470 | 3/1994 | Dutcher | 510/109 |

OTHER PUBLICATIONS

Eriez Manufacturing Co., Ferrous Traps (SB–420P), 1998, 8 pages (no month).

OxyTech Systems, Inc. (Tilak Bommaraju & Paul Orosz), Caustic Evaporator Coorosion: Causes and Remedy, Mar. 1992, 15 pages.

*Primary Examiner*—Arun S. Phasge
*Attorney, Agent, or Firm*—Wendy K. Buskop; Buskop Law Group

[57] ABSTRACT

The method involves the steps of: exposing a cell liquor containing metal to a first magnet, magnetically removing up to about one third of said metal present in the cell liquor, evaporating a significant amount of water out of that fluid, and raising the temperature of that fluid to above 220 Fahrenheit and adding a small amount of sodium borohydride ($NaBH^4$) to suppress the reaction of the caustic solution with metal in the manufacturing process, evaporating and flashing off more water from the caustic solution, cooling the solution after evaporation and then flowing it through and around a second magnet to magnetically removing an additional amount of metal the solution, filtering the solution and then magnetically removing an additional amount of metal from said solution forming a final caustic solution having 40–55% by weight caustic.

16 Claims, 2 Drawing Sheets

METHOD FOR REMOVAL OF NICKEL AND IRON FROM ALKALI METAL HYDROXIDE MANUFACTURING PROCESS REQUIRING THE USE OF SODIUM BOROHYDRIDE

BACKGROUND

The present invention relates to the manufacture of alkali metal hydroxides, commonly known as caustic. Alkali metal hydroxides are typically from the group of elements which includes sodium, lithium, cesium, potassium and rubidium. Caustic is made using different types of electrolytic cells, including membrane and diaphragm-type cells and then further treating the caustic to concentrate the solution. The present invention is directed to a method of further treating sodium hydroxide caustic which was created using a diaphragm-type electrolytic chlorine cell, but it is contemplated that this method of manufacture can be utilized in other alkali metal hydroxide processes as well.

A need has long existed in the caustic industry for a technique to remove nickel and or iron from a caustic manufacturing process which requires the additional use of sodium borohydride without adding still more chemicals to the manufacturing process.

A need has existed for an environmentally friendly metal removal process, particularly to remove iron and nickel which lowers the cost to manufacture at least two grades of caustic, standard and bleach grade.

Alkali metal hydroxide solutions are manufactured by the electrolysis of alkali metal salt solutions in electrolytic cells. Diaphragm cells are known for producing alkali metal hydroxide solutions electrolytically. In this type of cell, a porous cathode with an overlying porous diaphragm is used to separate or to serve as a barrier between the catholyte and anolyte compartments of the cell. After separation of the components, the caustic solution is then further treated to increase the concentration of caustic in the solution.

An objectionable feature of this subsequent treatment of the caustic is that the step of adding sodium borohydride has been required to control the amount of chemical reaction between the caustic and the first device for driving water out of the aqueous caustic solution. This device is commonly known as the "first effect evaporator." The first effect evaporator is usually nickel or coated nickel, such as nickel 200, and the caustic of the solution normally reacts with the nickel causing the build up of hydrated nickel oxide on the processing equipment. Traditionally, the sodium borohydride has reduced this chemical reaction.

The process of manufacture of caustic has been expensive because of the need for large amounts of sodium borohydride, a costly substance only available from two sources. There has been a need for a process for treating a caustic solution saturated with nickel and iron compounds, as well as free metal ions, nickel and iron oxides, and particulate amounts of nickel and iron, without the need for the large quantities of sodium borohydride.

The present invention is directed at a method for reducing the amount of free nickel and nickel oxides, free iron and iron oxides in the chlor-alkali systems, particularly for the diaphragm types of cells, without the need for large quantities of sodium borohydride to complete the manufacturing process.

In order to overcome the disadvantages of the prior art the present invention proposes the use of magnets in situ in the manufacturing process to overcome these problems caused by large quantity sodium borohydride addition.

SUMMARY OF THE INVENTION

The present invention relates to a method to control of the presence of nickel and/or iron in a caustic manufacturing process which requires the use of sodium borohydride using magnets.

The method involves the steps of: exposing a cell liquor containing metal to a first magnet, magnetically removing up to about one third of said metal present in the cell liquor, evaporating a significant amount of water out of that fluid, and raising the temperature of that fluid to above 220 Fahrenheit and adding a small amount of sodium borohydride (NaBH4) to suppress the reaction of the caustic solution with nickel in the manufacturing process, evaporating and flashing off more water from the caustic solution, cooling the solution after evaporation and then flowing it through a second magnet to magnetically remove an additional amount of metal from the solution, filtering the solution and then magnetically removing an additional amount of metal from said solution forming a final caustic solution having 40–55% by weight caustic.

It is an object of this invention to provide a method which enables caustic to be manufactured in a more environmentally friendly manner using 30–95% less sodium borohydride that previously needed.

It is an object of this invention to provide a method by which caustic can be manufactured less expensively than known techniques, by simply not needing to purchase as much expensive sodium borohydride.

It is an object of this invention to provide a method which removes nickel, iron or combinations thereof from a caustic manufacturing process.

These and other objects and advantages of the invention disclosed herein will become apparent to those skilled in the art from a reading of the following specification and the appended claims and by reference to the attached Figures.

DETAILED DESCRIPTION

Figure 1:
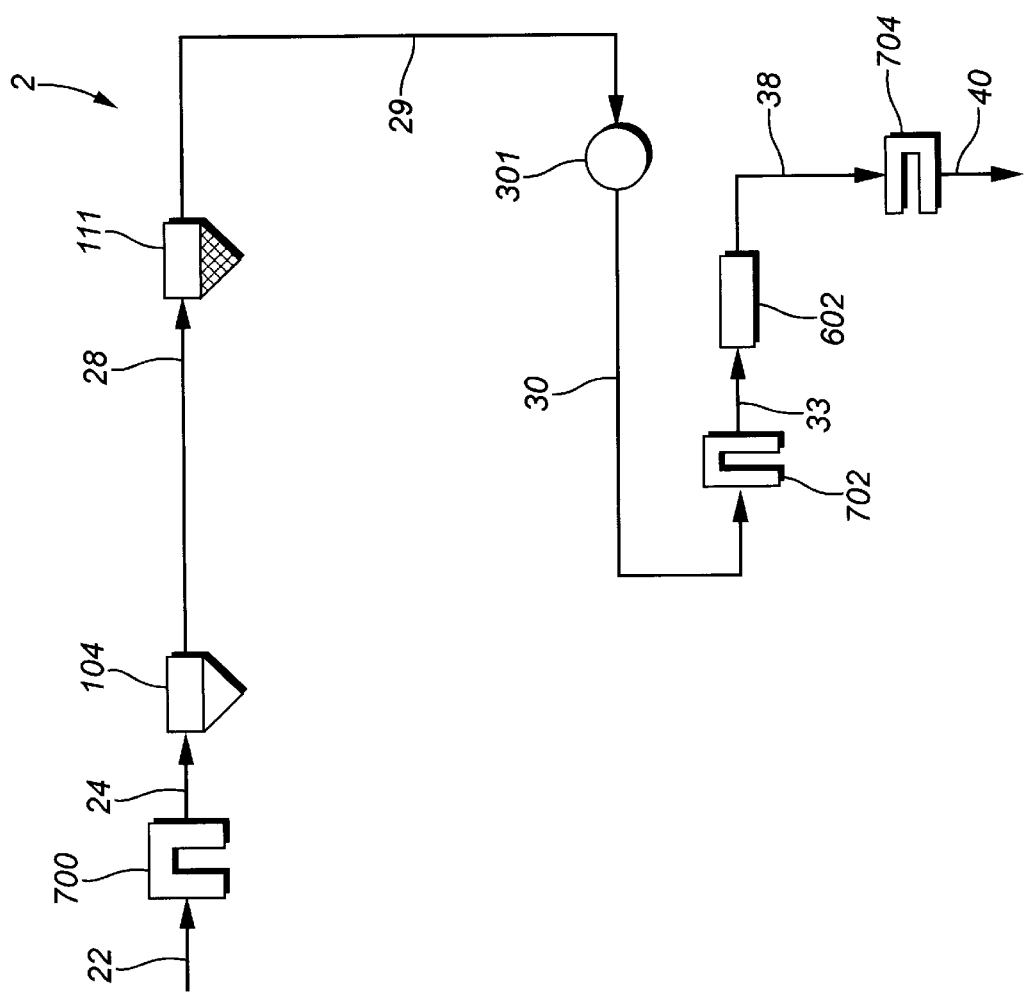
FIG. 1 is a flow chart describing a unique method for removal of metal from a manufacturing process for the production of alkali metal hydroxide solutions which requires the addition of only a small amount of sodium borohydride.
Figure 2:
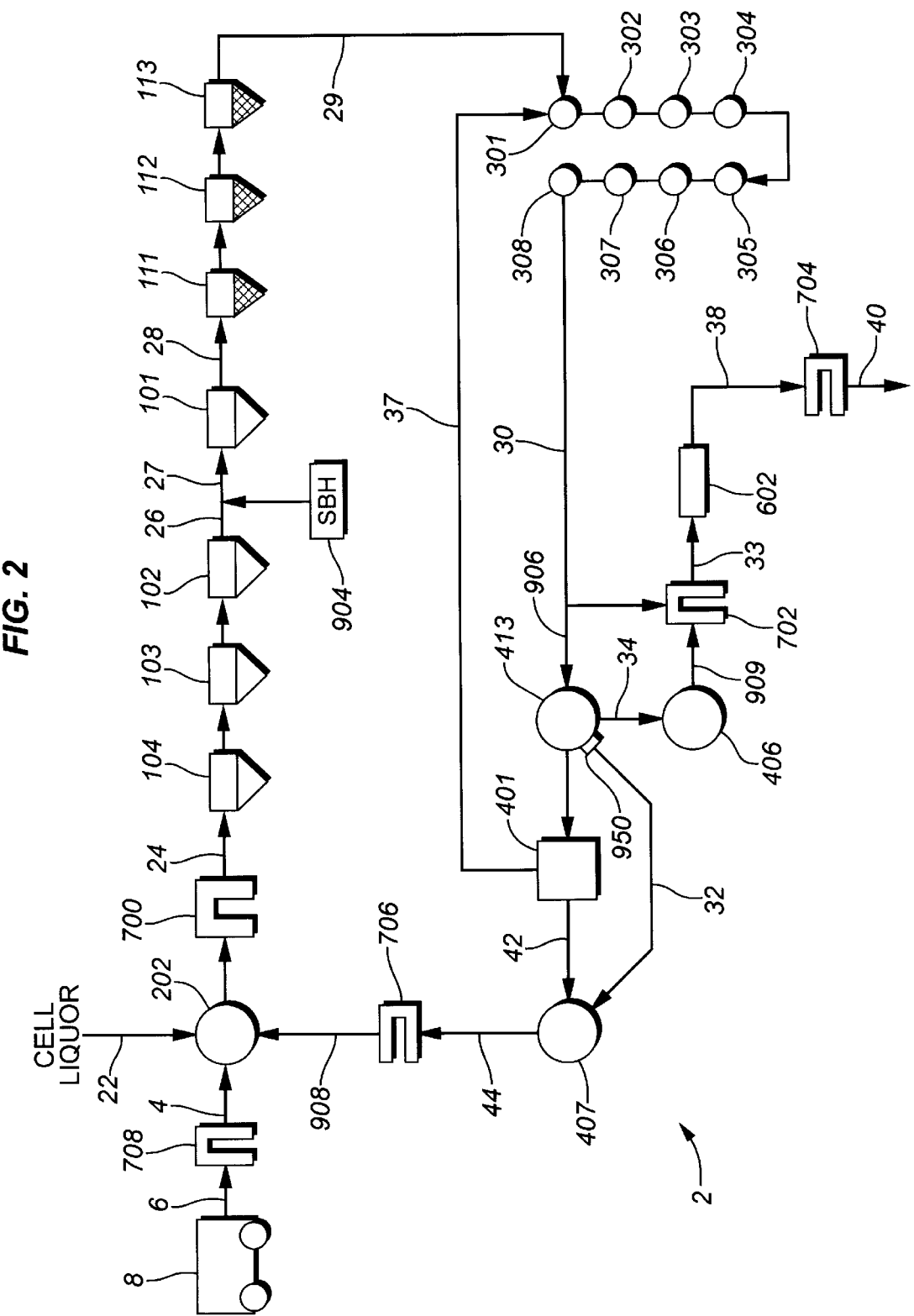
FIG. 2 is a detailed flow chart describing a unique chlor-alkali caustic manufacturing process using the magnetic traps to remove metal, such as nickel and iron.

Referring to FIGS. 1 and 2, the invention relates to a caustic manufacturing process (2) such as a chlor-alkali manufacturing process, which utilizes magnetic separators, and most preferably tubular magnets to remove metals, such as nickel, iron or both, from an aqueous alkali salt solution used to manufacture caustic. The metals can be in the form of metal particulates, metal oxides and metal hydrides.

The invention relates more particularly to a method for the use of at least two magnetic traps for removing iron, nickel or other metals from the fluid in a caustic manufacturing process and optionally, the invention can involves at least two more magnetic traps located in the manufacturing process.

The following terms will be used to describe this invention:

"Iron" refers to iron particulates and iron compounds, which is not in solution, including but not limited to iron oxides, (Fe203, Fe404) iron hydrides and particulates of iron metal, various forms of ferric oxides and ferrides (FeO4-).

"Nickel" refers to nickel particles and nickel compounds which are not in solution, including but not limited to nickel oxides, nickel hydrides, and particulates of nickel metal.

"Caustic manufacturing process" refers to a manufacturing process wherein alkali metal hydroxides are treated to produce a more concentrated, by weight percent, solution. Included in this definition, but not a limitation of this definition is the caustic manufacturing process wherein rock salt is processed into a brine, or brine is used as the initial material, and the salt solution is then passed into an electrolytic cell of the diaphragm type or membrane type, and then with the application of electricity, the cell separates the components into hydrogen, chlorine and caustic. The caustic is then further treated with various evaporation, flashing and cooling steps, including the addition of sodium borohydride in between two of the evaporation steps. After flashing, cooling and filtering occur and ultimately producing a solution of at least 50% caustic. It is considered within the scope of this definition to include all caustic solutions, which include solutions of sodium, lithium, cesium, potassium and rubidium.

"Chlor-alkali" when referred to herein, is the generic industry term used to define the process of making simultaneously, chlorine and caustic from a sodium chloride solution.

The present invention can be used for any caustic manufacturing process, but particularly is helpful for any alkali metal hydroxide aqueous solution manufacturing process which involves a diaphragm electrolytic cell for the separation of chlorine, caustic and hydrogen and the subsequent stream treatment which requires the use of sodium borohydride.

Details of the general electrolytic process can be see in U.S. Pat. No. 4,025,405 which is incorporated by reference herein. The most preferred embodiment of this invention utilizes the MDC-29 electrolytic system originally available from Diamond Shamrock.

In particular, the present invention can be used in caustic manufacturing processes which produce a bleach grade caustic with 0.5 PPM or less nickel present in the resultant product. However, the present invention shall also apply to the manufacture of standard grade caustic. Caustic has traditionally had a desired a nickel content of between about 3.0 and 0.51 PPM nickel and preferably about 1.0 PPM nickel.

The present invention involves a process for the production of alkali metal hydroxide using sodium borohydride which involves several key steps:
 a. electrolyzing an aqueous alkali metal salt solution forming hydrogen, chlorine and a caustic solution having at least 10 wt % caustic, at a temperature of from about 75° to about 100° C. and said aqueous alkali metal salt solution has a pH of between about 2–6; and
 b. treating said caustic solution magnetically to remove metals from the caustic solution using at least two magnets, a first magnet prior to evaporation, and a second magnet after evaporation, flashing and cooling.

It is intended that the at least two magnets are used in sequence during the production process, which can be a continuous production process or a batch production process.

More than two magnets are contemplated as usable in the present process, and it is contemplated that these magnets be in situ and placed at points after filtration and just prior to the recycle stream entering the caustic treatment system.

This unique process has been analyzed and it has been determined that at least 10% by weight of metal and easily between 20% and 30% by weight of metal is removed from the manufacturing process using each of these magnets. The use of the magnets significantly reduces the need for large amounts of sodium borohydride in the manufacturing process, requiring as little as 10% of the traditional amount of sodium borohydride needed to produce high quality caustic.

The following is a more detailed attempt to explain the preferred manufacturing process which requires significantly less sodium borohydride, and which is the subject of the present invention.

In both FIGS. 1 and 2, the caustic stream initially starts out as a cell liquor (22).

Cell liquor (22) is typically an aqueous solution having between about 10 and 13 wt % caustic, preferably averaging about 12 wt % caustic. Additionally, cell liquor (22) contains approximately 15% sodium chloride. Sodium sulfates may be present in the cell liquor (22) as well. The balance of the cell liquor (22) is typically water. The remainder of the cell liquor (22) contains various metals, including but not limited to iron and nickel in the parts per million range (PPM).

In the preferred embodiment, the caustic stream is a sodium hydroxide stream.

Cell liquor (22) is typically flowed to a first magnet (700), although it may first pass through a feed tank (202). Although one magnet (700) is contemplated, it is considered within the scope of the invention to use at least two magnets in situ to trap iron and nickel or combinations of both. This first magnet magnetically removes up to about one third of the metals and their related hydrides and oxides, present in the cell liquor (22).

The present invention is contemplated for use with a caustic manufacturing system which has a flow rate of typically between 600 to 900 gallons per minute, and a preferred flow rate of about 750–800 gals per minute.

The invention is for use with a caustic manufacturing system which maintains the temperature of the cell liquor (22) typically between 170–205 F. In the preferred embodiment, the temperature of the cell liquor (22) is maintained between 190–205 F.

Cell liquor (22) is passed through this first magnet (700) which can be one built by Eriez Manufacturing Company of Erie Pa., as described in U.S. Pat. No. 5,236,091 which is hereby incorporated by reference.

In the preferred embodiment magnet (700) is a rare earth magnet, called a "permanent magnetic ferrous trap", model T10 Re3HP Trap, style 9900032, built by Eriez. It is contemplated that other magnets can be used, such as those manufactured by Industrial Magnetics of Boyne City, Mich. Rare earth magnets which are capable of trapping both iron and nickel are considered the most usable magnets in the present invention. It is considered to be within the scope of this invention to use other magnets, as is feasible given the engineering parameters for the process. For example, electromagnets, ceramic magnets and other similar magnets may be usable within the scope of this invention.

Magnet (700) can be a tubular magnet, placed in situ in cell liquor (22). Other magnet geometries and shapes are possible within the scope of the present invention. Simply, the aqueous solution of the manufacturing process needs to flow through or around the magnet (700) to enable entrapment of the metal oxides, hydrides, particles and free metals.

If a tubular magnet is used, the size of the magnet will depend on the flow rate of the cell liquor (22) and the size of the piping and tanks used to manufacture the caustic. It is possible, for example, that within the scope of the present invention, the tubular magnet could be of a size that has up to or in excess of 100 tubes. The size of the magnet will depend on the size of the facility and the composition of the actual stream. The viscosity of the cell liquor (22) will also effect the size and type of magnet usable in this process. It is contemplated that any size magnet can be used herein within generally accepted engineering principles for a particular process.

In the most preferred embodiment, it is contemplated that magnet (700) has from 1 to 17 tubular members, and most preferably 11 tubular members. The most preferred embodiment contemplates a manufacturing flow rate of between 650 to 800 gallons per minute flowing from a vessel size of 16 ft diameter, by 15 feet high.

Testing using the chlor-alkali manufacturing process reveals that this first magnet (700) can remove up to about 33% of the metal present in the solution, specifically, it removes up to 33% of the nickel oxides, nickel compounds, and iron oxides and iron compounds present the stream.

As an example, if nickel is present in the caustic manufacturing system, and the caustic manufacturing system runs at about 750–800 gals per minute, the particular amount of nickel removed is enough so that less than 0.1 PPM nickel can be detected in the stream. The process can clearly handle nickel removal of levels between 0.5 PPM to 1.0 PPM nickel reduction in the stream flowing at 650–800 gals per minute. In those same streams, about the same amount of iron can be removed by the first magnet (700) leaving the small detection limits.

After the fluid passes through the magnet (700), the resultant stream, termed herein the first fluid (24), is then passed to at least one evaporator.

The first fluid (24) preferably is passed through a quadruple effect evaporation system which utilizes a first evaporator (104), a second evaporator (103) and a third evaporator (102) forming concentrated caustic solution (26), raising the temperature of the solution to about 220–230 Fahrenheit, most preferably 225 degrees Fahrenheit. After evaporator (102), sodium borohydride (904) is added to concentrated caustic solution (26) forming a more concentrated caustic solution (27) and the temperature is raised to at least 325–335, preferably 330 degrees Fahrenheit. More concentrated caustic solution with sodium borohydride (27) is then passed to evaporator (101). Prior to passing through the evaporators (104), (103), (102) and (101), first fluid 24 has a concentration of between 10 and 13% caustic.

Sodium borohydride is typically added to reduce the reaction of hot caustic with the nickel used in the evaporators.

First evaporator (104) is preferably a Swensen evaporator which is capable of evaporating off a portion of the water in the solution and thereby reducing the temperature of first fluid (24) to operate between about 120 to 135 F., and most preferably 130 F.

In the most preferred embodiment, the evaporator is constructed to handle the flow rates and viscosity and density characteristics of the incoming stream. By way of example, a typical evaporator can have an 18 foot 6 inch diameter, with 15 feet straight side. Preferably, this first evaporator is of stainless steel construction.

Second evaporator (103) is preferably a Swensen evaporator and in the preferred embodiment, has a 15 foot diameter and a 15 foot 10 inch straight side. In the most preferred embodiment, ¾ inch stainless steel is used to construct this second evaporator. Swensen evaporators are available from Swensen located in Harvey, Ill. Also in the preferred embodiment, the operating temperature of the evaporator (103) ranges from 170 to 185 F., and most preferably at 180 F.

Third evaporator 102 preferably is a Swensen evaporator capable of evaporating off still more water from the first fluid (24) and having a 14 foot diameter and a 15 foot 10 inch straight side. In the most preferred embodiment, this evaporator is made from nickel, or the heaters used with the vessel of the evaporator are made from nickel. The evaporator preferably has a temperature range of operation of between 220–230 F. and most preferably about 225 F.

Sodium borohydride is added to concentrated caustic solution (26).

In a preferred embodiment, enough sodium borohydride is added to establish a 10 to 20 PPM concentration of sodium borohydride in the concentrated caustic solution (26). In the preferred embodiment, the solution known as the brand Venpure from Morton, International, of Chicago, Ill. can be used. The solution with the sodium borohydride added is known as a more concentrated caustic solution (27). Venpure is a registered trademark of Morton.

Sodium borohydride is a strong reducing agent which donates hydrogen. It is stable, has a long storage time and is easy to handle. In the most preferred embodiment, 12% $NaBH_4$ is in a solution of 40% NaOH and approximately 48% $H_2O$.

Although nickel is typically used as a material of construction in high temperature and high assay sodium hydroxide applications, corrosion of the nickel still occurs. Sodium borohydride works by suppressing the reaction of the nickel with the caustic.

More concentrated caustic solution (27) is fed to yet a fourth evaporator (101) which is preferably a Swenson evaporator capable of evaporating off still more water from the more concentrated caustic solution (27). This evaporator preferably has a 13 foot diameter with a 17 foot 10 inch straight side. In the most preferred embodiment, this evaporator is made from nickel, such as Nickel 200 and operates at a temperature range between 325° to 335° F. and most preferably at about 330° F. The resulting solution is a highly concentrated caustic solution (28). Highly concentrated caustic solution (28) has a caustic concentration range of between 44 to 47% caustic.

Highly concentrated caustic solution (28) is then passed through one or more flash pans to further concentrate the caustic concentration to the most preferred range of 49 to 51 wt % caustic, however, it is noted that the range of 40–55 wt % caustic is acceptable. It is believed that a range of 40–55 wt % caustic is within the scope of the present invention. The flash pans serve to cool the highly concentrated caustic solution (28) from a temperature of between 325 to 335 F. to about between about 180–200 F. Typical flash pans usable in the present invention are Swensen Nickel 200 having a dimension of 4 feet in diameter and 14 feet high.

It is within the scope of the present invention to only use one flash pan or one evaporator with the manufacturing process. However, in the preferred embodiment, four evaporators and three flash pans are used.

Fluid from flash pans (111), (112) and (113) is referred to as second fluid (29). After flashing, second fluid (29) is then passed through at least one cooler to reduce the temperature of the second fluid (29).

In the preferred embodiment, eight coolers are used (301), (302), (303), (304), (305), (306), (307), and (308). The coolers (301) through (308) cool second fluid (29) to between 75 and 100 F. Coolers usable in the scope of the present invention are agitated tanks with coils cooled by cooling tower water which reduces the second fluid (29) the temperature by 8 to 18 degrees Fahrenheit per cooler. The resulting solution is cooled solution (30).

Cooled solution (30) can flow directly to second magnet (702) or it can be divided and flow both to the second magnet (702) and to clarifier (413) as a first cooled solution stream (906). Second magnet (702) extracts and additional percentage of metal, such as nickel or iron, or both forming a second cooled stream (33).

It is contemplated that the second magnet (702) is smaller in size and has a fewer number of tubes than the first magnet (700). In the preferred embodiment, a magnet of between 1 and 17 tubular members can be used, most preferably 7 tubular members. The 7 tubular member magnet should be capable of enduring between 50 and 150 gallons per minute flow rate and more preferably, a flow rate of between 100 and 110 gallons per minute. In the most preferred embodiment, the flow rate is 100 gallons per minute.

Flow rates through or around the magnets (700) and (702) can change depending on the viscosity, density and other physical properties of the solution going through or around the magnets. Accordingly, different flow rates can be used within the scope of the present invention based on normal engineering principles.

To work at optimum levels of efficiency, it is contemplated that the magnets of the present invention be inspected and cleaned by washing on a periodic basis. Interior tubular members of the magnets may need to be removed from the magnet housing situated in the fluid of the manufacturing process. This cleaning may be needed once every 12 hour shift, but it may not be needed that often, depending on the concentration of metal in the fluid.

Other types of magnets can be used within the scope of the present invention other than those tubular magnets. Any magnet can be sued which is capable of removing the metal particles, particularly the iron and nickel in the fluid of the manufacturing process.

After passing through second magnet (702), the resulting solution is a second cooled solution (33) and this solution is then passed to a filter (602). Filter (602) is a pressure leaf filter such as those made by Durco.

It is contemplated to be within the scope of this invention to use two filters (602) and an identical filter, (not shown in the Figure) in this caustic manufacturing process (2). The second filter, although not required, can be used operationally while maintenance is done on filter (602) or while filtrate removal occurs.

In the preferred embodiment a filter available from Duriron Company Inc. of Angola, N.Y. can be used, known as a Durco 60 HC 1040 filter is used. Filter (602) and the optional identical filter (not shown) preferably have filter areas of 1040 sq. feet and 36 leaves. Other filters are considered usable within the scope of this invention. Also, two filters could be of different sizes as long as the manufacturing flow capacity is met by the filtration step.

Filter (602) forms a filtered solution (38) which is passed to a third magnet (704) which magnetically removes additional metal, such as iron and nickel. The resulting solution is at least 40–55 wt % caustic and most preferably in the range of 49–51 wt % caustic solution with low nickel content (40). It is contemplated that the present invention will work with a resulting solution in the range of 40–55 wt % caustic, even though 49–51 wt % is the preferred range.

Magnet (704) is preferably a rare earth magnet called a model HTT03R (3 inch body size) magnet build by Industrial Magnets located in Boyne City, Mich.

Liquid from salt stream collection tank (407) (hereafter termed the final stream (44)) can then be optionally passed through an additional magnet (706) and additional nickel or iron or both can be magnetically removed from the final stream (44). Magnet (706) is preferably a rare earth magnet having between 1 and 17 tubular members, most preferably 7 tubular member and a four inch housing.

Final stream (44) passing out of magnet (706) flows to feed tank (202) for recycling through this caustic manufacturing process via feed line (908).

Optionally, but not required in the present invention is the additional step of passing first cooled solution (906) through a clarifier (413) for separating solids and salts and forming three streams, a salt stream (36), a separated stream (34) which is then directed to a feed tank (406), and a scum box stream (32). In the commercial embodiment of this invention, feed tank (406) is connected to magnet (702) via feed tank line (909).

Clarifier (413) is a tank with a rake used to separate the first cooled solution (906). The claifier (413) uses an EIMCO 25 foot, 8 inch diameter rake with a 4 by 7 and ½ inch straight depth.

As a result of passing through clarifier (413), salt stream (36) is a thickened salt slurry stream which flows to solid bowl (401). The solid bowl (401) acts as a centrifuge to separate out the salts from the liquid.

The separated stream (34) is 49–51 wt % caustic which flows to tank (406). This stream could be in the range of 40–55 wt % caustic and still be within the scope of the present invention. The scum box stream (32) is a salt slurry stream which flows into salt stream collection tank (407).

In the preferred embodiment, scum box stream (32) is passed through a scum box (950) to collect the foam from the top of the scum box (950) and then passed to salt stream collection tank (407).

Solid bowl (401) acts as a centrifuge to separate out liquid (37) (containing 50% caustic) from heavy salt forming a heavy salt stream (42). The separated caustic liquid (37) can then be recycled back to a cooler, such as cooler (301). The resulting heavy salt stream (42) flows to the salt stream collection tank (407). Two streams, (42) and (32) are combined in salt stream collection tank (407).

It is contemplated to be within the scope of the invention that this magnetic process for the removal of metals, particularly nickel and/or iron from a caustic manufacturing process can be performed as a batch removal process, or in situ as part of a continuous flow manufacturing process.

EXAMPLE

An MDC-29 electrolytic cell manufactured by Diamond Shamrock, operating at 40–80 KA amperage, having an anode surface area of 29 square meters, utilizes a 4 magnet treatment process can be used with the inventive magnetic removal process with a small amount of sodium borohydride. In this example, the first magnet is an eleven member tubular magnet, the second, third and fourth magnets are 7 tubular member magnets. The cell liquor (22) used at the start of the process is 13% caustic. The cell liquor (22) is flowed through the first magnet (700) at a rate of about 650–750 gallons per minutes. The cell liquor is heated to over 330 F., then cooled. The cell liquor is passed through another magnet at about 100 gallons per minute, and as a result of the two step process 30% of the nickel is removed from the process. As an added benefit, at least 30% of the iron is removed from the caustic manufacturing process.

The following is a table showing the amount of nickel in the caustic manufacturing process prior to exposure with the magnets and the amount of nickel in the resultant product after exposure to the magnetic process. The clear environmental advantage of this process can be seen in this table. The following data is from January 1999 tests of the process. Detection limit is 0.1 ppm.

| Cell Liquor | Stream 28 | Final Product 40 |
|---|---|---|
| Before Magnet January 1999 | | |
| 0.5 ppm Ni | 2.0 ppm Ni | 2.5 ppm Ni |
| 0.82 ppm NI | 2.97 ppm Ni | 1.62 ppm Ni |
| 0.23 ppm Ni | 1.5 ppm Ni | 1.8 ppm Ni |
| 0.55 ppm Ni | 3.5 ppm Ni | 3.5 ppm Ni |
| 0.33 ppm Ni | 1.8 ppm Ni | 3.0 ppm Ni |
| After Magnets are inserted in the process May–June 1999 | | |
| Ni not detected | Ni not detected | Ni not detected |
| Not detected to 0.2 ppm | Not detected to 0.5 ppm | Not detected to 0.5 ppm |

With the above description, the present invention consists of the combination and arrangement of parts, and steps described herein and illustrated in the accompanying figures, however, it is understood that changes may be made in the order of the steps, size of the units, and minor details without departing from the spirit of the present invention.

What is claimed is:

1. A method for the control of the presence of metal in a alkali metal hydroxide manufacturing process comprising the steps of:

exposing a cell liquor containing metal to a first magnet;

magnetically removing up to about one third of said metal present in the cell liquor forming a first fluid;

evaporating a significant amount of water out of said first fluid using a first evaporator and raising the temperature of said first fluid to above 220 Fahrenheit and forming a concentrated caustic solution;

adding a sufficient amount of sodium borohydride (NABH$^4$) to said concentrated caustic solution forming a more concentrated caustic solution to suppress the reaction of said concentrated caustic solution with nickel in the alkali metal hydroxide manufacturing process;

evaporating said more concentrated caustic solution using a second evaporator forming a highly concentrated caustic solution;

flashing off water from said highly concentrated caustic solution with at least one flash pan forming a second fluid;

cooling said second fluid using at least one cooler forming a cooled solution;

exposing the cooled solution to a second magnet;

magnetically removing an additional amount of metal from said cell liquor forming a second cooled stream;

filtering said second cooled stream using at least one filter and forming a filtered solution;

continuously providing the filtered solution to a third magnet and;

magnetically removing an additional amount of metal from said filtered solution forming a final caustic solution comprising 40–55 wt % by weight caustic.

2. The method of claim 1, comprising the additional steps of:

passing the cooled solution to a clarifier which forms a scum box stream, a separated stream and a salt stream;

flowing said salt stream to a solid bowl and centrifuging said salt stream forming a solids stream;

flowing the separated stream to said second magnet and magnetically removing any remaining nickel forming second cooled solution.

3. The method of claim 2, wherein said solids stream is exposed to a fourth magnet which magnetically removes additional metal from the solids stream.

4. The method of claim 1, wherein the first magnet has between 1 and 17 tubular members.

5. The method of claim 1, wherein the second magnet has between 1 and 7 tubular members.

6. The method of claim 1, wherein the third magnet is approximately the same number of tubular members as the second magnet.

7. The method of claim 1, wherein said evaporative step uses between 1 and 4 evaporators.

8. The method of claim 1, wherein said evaporative step uses between 1 and 4 evaporators and between 1 and 3 flash pans.

9. The method of claim 1, wherein said cooling step uses between 1 and 8 coolers.

10. The method of claim 1, wherein the first magnet is larger than the second and third magnets.

11. The method of claim 1 wherein the metal is a nickel selected from the group comprising nickel oxide, nickel hydrides, nickel particulate, and free nickel ions and combinations thereof.

12. The method of claim 1, wherein the metal is an iron selected from the group iron oxide, iron hydrides, ferrides, particulate iron and free iron ions and combinations thereof.

13. A process for the production of alkali metal hydroxide substantially free from a metal which is selected from the group comprising nickel, iron and combinations thereof which comprises:

a. providing an aqueous alkali metal hydroxide solution to the anode compartment of an electrolytic cell in which a dimensionally stable anode and a cathode are maintained in separate anode and cathode compartments, respectively, and separated by a diaphragm interposed between said anode and said cathode;

b. electrolyzing the aqueous alkali metal hydroxide solution forming hydrogen, chlorine and a caustic solution while maintaining said solution at a temperature of from about 75° C. to about 100° C.;

treating said caustic solution with sodium borohydride to minimize chemical reactions of caustic with nickel; and c. magnetically remove metals from the solution using at least two magnets by flowing the solution through the magnets during the production process.

14. The process of claim 13, wherein between 20 and 30% by weight of said metal is removed.

15. The process of claim 13, wherein the nickel and iron comprise members of the group consisting of: particulate nickel, particulate iron, iron oxide, nickel oxide and related nickel and iron compounds and combinations thereof.

16. The process of claim 13, wherein said at least two magnets are rare earth magnets.

* * * * *